(12) United States Patent
Su

(10) Patent No.: US 10,055,296 B2
(45) Date of Patent: Aug. 21, 2018

(54) SYSTEM AND METHOD FOR SELECTIVE BIOS RESTORATION

(71) Applicant: Quanta Computer Inc., Taoyuan (TW)

(72) Inventor: Mei-Lin Su, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 168 days.

(21) Appl. No.: 14/928,192

(22) Filed: Oct. 30, 2015

(65) Prior Publication Data
US 2017/0123927 A1    May 4, 2017

(51) Int. Cl.
G06F 11/14    (2006.01)
G06F 9/44     (2018.01)
G06F 9/4401   (2018.01)

(52) U.S. Cl.
CPC ........ *G06F 11/1417* (2013.01); *G06F 9/4401* (2013.01); *G06F 9/4403* (2013.01); *G06F 2201/805* (2013.01)

(58) Field of Classification Search
CPC ..... G06F 11/1417; G06F 9/4401; G06F 9/441
See application file for complete search history.

(56) References Cited

U.S. PATENT DOCUMENTS

| 7,117,348 | B2 * | 10/2006 | Holmberg | G06F 8/65 |
| | | | | 713/1 |
| 7,484,084 | B1 * | 1/2009 | Ranaweera | G06F 8/656 |
| | | | | 713/1 |
| 7,577,829 | B2 * | 8/2009 | Dennis | G06F 11/1417 |
| | | | | 713/1 |
| 8,122,235 | B2 * | 2/2012 | Khatri | G06F 9/4401 |
| | | | | 713/2 |
| 2006/0020844 | A1 * | 1/2006 | Gibbons | G06F 11/142 |
| | | | | 714/2 |
| 2007/0016765 | A1 * | 1/2007 | Azzarito | G06F 9/4411 |
| | | | | 713/2 |
| 2008/0141016 | A1 * | 6/2008 | Chang | G06F 11/1433 |
| | | | | 713/2 |
| 2008/0215868 | A1 * | 9/2008 | Lee | G06F 9/4401 |
| | | | | 713/1 |
| 2008/0288557 | A1 * | 11/2008 | Chiu | G06F 11/1417 |
| 2010/0250910 | A1 * | 9/2010 | Watanabe | G06F 11/1443 |
| | | | | 713/2 |
| 2013/0305027 | A1 * | 11/2013 | Jiang | G06F 9/4401 |
| | | | | 713/2 |

(Continued)

FOREIGN PATENT DOCUMENTS

| CN | 103488498 A | 1/2014 |
| TW | 200907804 A | 2/2009 |

OTHER PUBLICATIONS

Taiwanese Office Action for Application No. 105111600, dated Nov. 17, 2016 w/ English First Action Summary.

*Primary Examiner* — Paul F Contino
(74) *Attorney, Agent, or Firm* — Nixon Peabody LLP; Eduardo J. Quiñones

(57) ABSTRACT

Embodiments generally relate to system firmware management in a computing system. Aspects of the embodiments enable a selective BIOS restoration process by storing and retrieving BIOS modification record in a storage device. By utilizing a relative inexpensive service controller, some embodiments herein can achieve a remote and efficient BIOS recovery management method.

20 Claims, 5 Drawing Sheets

(56) References Cited

U.S. PATENT DOCUMENTS

| | | | |
|---|---|---|---|
| 2015/0186233 A1* | 7/2015 | Young | G06F 11/366 714/38.14 |
| 2016/0019116 A1* | 1/2016 | Gopal | G06F 11/1417 714/19 |

* cited by examiner

SYSTEM AND METHOD FOR SELECTIVE BIOS RESTORATION

FIELD OF THE INVENTION

The disclosure relates generally to system firmware management in a computing system.

BACKGROUND

A basic input/output system (BIOS) is a firmware that ensures a system's computing components are functional. The BIOS stores firmware that is executed when the computer system is first powered on, along with a set of configurations specified for the BIOS. The BIOS typically recognizes, initializes, and tests hardware in a computing system.

For example, the BIOS first executes a power on self test (POST) and then load the operation system (OS). The BIOS also provides an interface that allows a variety of different parameters to be set. Particularly, the BIOS specifies clock and bus speeds and other parameters that affect performance of the computer system. The BIOS finally transfers control of the computer system to an operating system. The BIOS configurations are stored in a non-volatile memory (e.g., a non-volatile random-access memory (NVRAM)) or a read-only memory (ROM).

Various BIOS errors caused by user mistakes, power interruption during changing the BIOS, or virus infection can render a BIOS dysfunctional. As a computer cannot be booted without a functional BIOS, a corrupted BIOS can cause computer failures and damage system performance.

SUMMARY

Aspects of some embodiments disclose techniques that enable a selective BIOS restoration by storing and retrieving BIOS modification record in a storage device. By utilizing a relative inexpensive service controller, some embodiments herein achieve a remote and efficient BIOS recovery management method. Some embodiments herein also enable an out-of-band server management when the main server is powered off or unavailable.

Aspects of some embodiments disclose a computer-implemented method, comprising: storing firmware modification record to a storage medium of a computing device, the firmware modification record including at least one setting of a basic input/output system of the computing device, modifying the at least one setting in the basic input/output system, determining a failure in executing the modified basic input/output system, retrieving, in response to the determining, at least a portion of the firmware modification record from the storage medium, and restoring, based at least in part on the at least a portion of the firmware modification record, one or more settings of the basic input/output system.

According to some embodiments, the service controller is a baseboard management controller (BMC). A BMC is responsible for the management and monitoring of the main central processing unit and peripheral devices on the motherboard. For example, a BMC communicates with other internal computing components via Intelligent Platform Management Interface (IPMI) messages. A BMC communicates with external computing devices using Remote Management Control Protocol (RMCP). Alternatively, a BMC communicates with external devices using RMCP+ for IPMI over LAN.

According to some embodiments, a service controller such as a BMC retrieves BIOS record data from a storage device, hosts a web interface which displays multiple stored BIOS setting images, and receives a user selection of a preferred BIOS setting image for overriding the system BIOS. Other service controller such as an Innovation Engine can also enable the multi-point, selectable BIOS restoration as disclosed herein. According to some embodiments, an administrator browses the optional BIOS setting images and select a preferred BIOS setting image for overriding the faulty system BIOS. Additionally, a BMC can notify a BIOS of which BIOS setting image has been selected for booting up the computing system.

According to some embodiments, a hardware jumper is used to trigger a recovery of the BIOS setting image. Accordingly, the system determines whether to restore a BIOS setting based on the status data of the hardware jumper.

According to some embodiments, the system determines an applicable BIOS restoration mode for each BIOS modification. There are three optional BIOS restoration modes: 1. an automatic backup mode which autonomously stores each BIOS modification data; 2. a manual backup mode which further query an administrator whether to store the recent BIOS modification; and 3. a disabled backup mode which disables the BIOS restoration function and allows the system working like an ordinary computing system.

Although many of the examples herein are described with reference to a BMC, it should be understood that these are only examples and some embodiments are not limited in this regard. Rather, any service controller or management central processing unit (CPU) may be used.

Additionally, even though the present disclosure uses BIOS as an example of the restorable firmware or system configuration, aspects of some embodiments are applicable to other restorable firmware that can suffer from inadvertent errors. As disclosed in the present disclosure, such firmware can be stored in a storage device and later retrieved for replacing an earlier faulty version. Examples of such restorable firmware or system configuration include settings of CPU, memory, Peripheral Component Interconnect Express (PCIe) card, etc.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Figure 1:
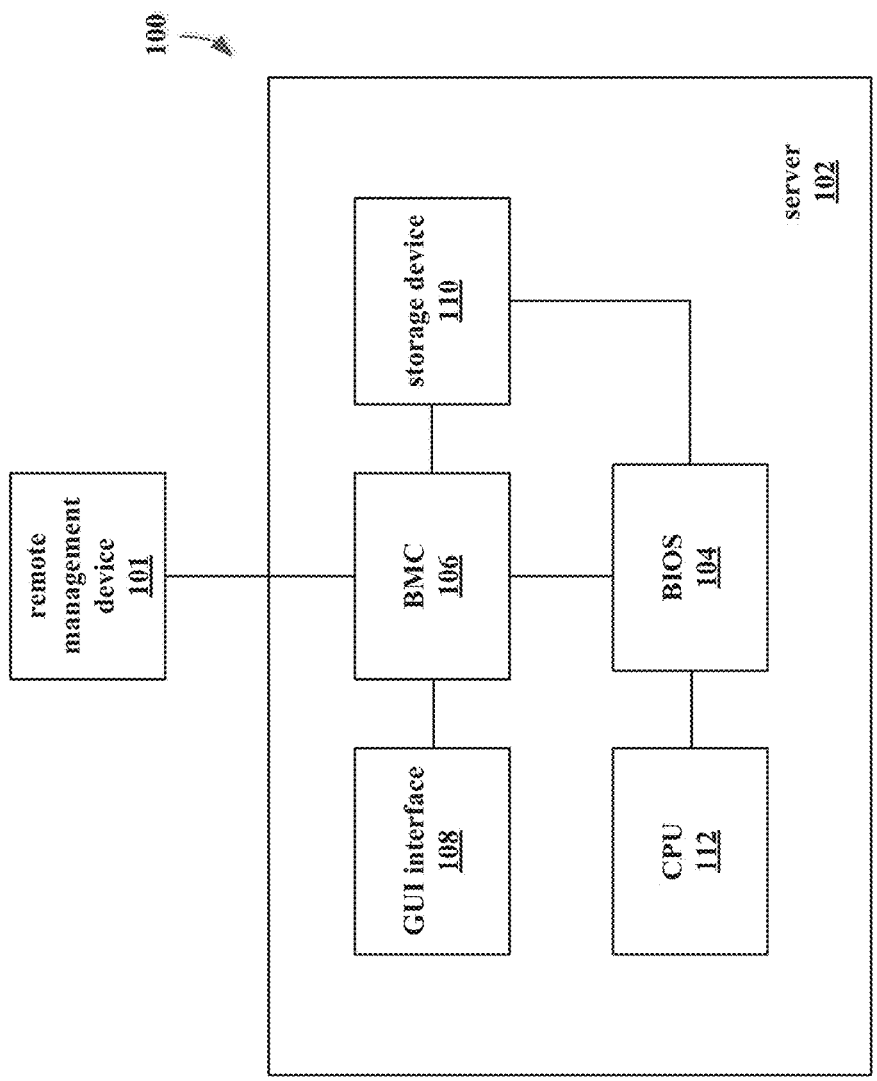
FIG. 1 is a schematic block diagram illustrating an example of a BIOS recovery management system, according to some embodiments.

Various embodiments of the present disclosure are discussed in detail below. While specific implementations are discussed, it should be understood that this is done for illustration purposes only. A person skilled in the relevant art will recognize that other components and configurations may be used without departing from the spirit and scope of the present disclosure.

The BIOS is responsible for initializing and testing hardware components of a computing system. The BIOS provides an abstraction layer for the hardware thereby providing a consistent way for applications and operating systems to interact with a peripheral device such as a keyboard, a display, and other input/output devices.

For example, the BIOS runs system check prior to booting up the operating system (OS), e.g., the Microsoft Windows® OS, the Linux® OS, or any operating system. System check is a diagnostic system examination executed during initialization of a computing device. A Power-On Self-Test (POST) is an example of system check. The major functions of a POST are handled by the BIOS, which may assign some of these duties to other programs designed to initialize specific peripheral devices, such as video and small computer system interface (SCSI) initialization. The principal functions of the BIOS during POST include verifying CPU registers and the integrity of the BIOS code, checking basic components, examining system main memory, and passing control to other specialized BIOS extension. The POST can also be configured to discover, initialize, and catalog all system buses and devices, provide a user interface for system's configuration, and construct a system environment required by the operating system.

The BIOS parameters are frequently changed based on a customer's hardware or software requirements. However, an administrator who is unfamiliar with the computing platform design and corresponding BIOS can inadvertently introduce noncompliant BIOS modifications that corrupt the system. Other risk factors include power interruption during BIOS modification, or BIOS virus infection.

A corrupted BIOS setting may be restored to a factory setting of the BIOS. For example, using a duplicate BIOS memory (e.g. a backup BIOS chip) that stores the default BIOS setting, an administrator can reset a BIOS to its default parameters by using a clear CMOS/NVRAM jumper. However, this approach eliminates all the previous modifications to the BIOS. Additionally, it is expensive to implement duplicate BIOS memory when there is a large number of computing systems that need to be managed. e.g., in a data center.

Thus, there is a need to provide a BIOS management system that can offer flexible and efficient BIOS recovery. Some embodiments herein enable a multi-point BIOS recovery process by storing the firmware (BIOS) modification record in a storage device. Particularly, aspects of the embodiments improve the efficiency of the BIOS recovery. Further, aspects of the embodiments enable an out-of-band system configuration update when the main CPU is powered off.

FIG. 1 is a schematic block diagram illustrating an example of a BIOS recovery management system, according to some embodiments. A BIOS recovery management system 100 includes, for example, server 102 and remote management device 101. For purpose of this disclosure, server 102 is any computing device operable to compute and process any form of data. For example, server 102 is a personal computer, a network storage device, a network computing device. According to some embodiments, server 102 includes CPU 112, BMC 106 (baseboard management controller), BIOS 104 and storage device 110. Server 102 additionally includes, for example, various input/output devices such as a display, one or more storage devices such as redundant array of independent disks (RAID), and one or more network interface controllers (NICs). Server 102 communicates with remote management device 101 via a wired network connection such as Ethernet, or a wireless network connection such as a local area network (LAN) or a wide area network (WAN).

Remote management device 101 can be any suitable computing device that is used by a system administrator to manage a server. For example, remote management device 101 is a personal computer, a tablet, or a web-based system. As shown in FIG. 1, remote management device 101 connects to BMC 106 via a network interface for monitoring and managing hardware and software functionalities of server 102. For example, remote management device 101 stores, in a storage medium, updated BIOS configuration that can be used to modify a BIOS setting in BIOS 104.

CPU 112 is configured to execute program instructions for specific functions. For example, during a booting process, CPU 112 accesses BIOS 104 stored in a BIOS memory or chip and execute program instructions to initialize server 102.

BIOS 104 includes any program instructions or firmware configured to initiate and identify various components of server 102, including device such as a keyboard, a display, a data storage, and other input or output devices.

BIOS 104 saves all or partial BIOS modification data (or firmware modification record) in storage device 110. For example, when the BIOS setting or BIOS setting image is modified for multiple times over a period of time, BIOS 104 stores each BIOS setting before modification as BIOS record data in storage device 110. Alternatively, BIOS 104 stores only selected BIOS settings that meet certain criteria such as an administrator's approval or a predetermined condition specified by the administrator. For example, an administrator requires BIOS 104 to save BIOS modification data only pertaining to one or more specific BIOS parameters.

According to some embodiments, BIOS modification data includes detailed editing information with regard to various parameters in the BIOS. For example, a boot priority order can be changed to allow one device to be booted instead another when two or more bootable devices are available. BIOS modification data includes BIOS record data over a predetermined period of time, such as one year. Additionally, BIOS modification data can also be capped at an amount that is defined by the administrator or limited by the data capacity of the storage device.

As illustrated in FIG. 1, server 102 can include one or more service controllers such as BMC 106. A BMC is an independent and embedded microcontroller that, in some embodiments, is responsible for the management and monitoring of the main central processing unit (e.g., CPU 112) and peripheral devices on the motherboard (e.g., switches, computing nodes and storage nodes). According to some embodiments, BMC 106 communicates with remote management device 101 via a dedicated network interface (e.g., a LAN) implemented by an associated network interface controller (not shown). According to some embodiments, BMC 106 communicates with storage device 110 via a communication link, e.g. I2C, SMBUS interface or memory-mapped I/O interfaces.

With a power supply and operating system that are independent from CPU 112, BMC 106 implements out-of-band management when server 102 is powered off or disabled. An out-of-band management can use a dedicated channel for managing network devices. For example, BMC 106 communicates with remote management device 101 via Remote Management Control Protocol (RMCP) or RMCP+ for Intelligent Platform Management Interface (IPMI) over LAN. Further, the out-of-band management enables a network-based BIOS restoration mechanism which allows the administrator to remotely restore the BIOS settings via a network interface, e.g. local area network (LAN).

The IPMI specification defines an interface to the hardware that monitor server physical health characteristic such as temperature, voltage, fans, power supplies and chassis status. For example, the IPMI specification includes automatic alerting, automatic system shutdown and restart, remote restart and power control capabilities. By utilizing a service controller like a BMC, the IPMI specification also defines an interface for remote management of servers and systems that is independent from the main CPU, BIOS and operation system.

According to some embodiments, BMC 106 hosts GUI interface 108 that displays a graphical user interface including multiple optional BIOS setting images in a BIOS option log via a web interface. For example, BMC 106 retrieves BIOS record data in storage device 110. Accordingly, an administrator browses the optional BIOS setting images and select a preferred BIOS setting image for overriding the faulty system BIOS. For example, GUI interface 108 displays a list of BIOS setting image options on remote management device 101 via a web interface. Based the system's hardware and software requirements, an administrator can correspondingly select a BIOS setting image to replace the faulty BIOS setting. Consequently, BMC 106 notifies BIOS 104 of which BIOS setting image has been selected for booting up the system.

According to some embodiments, the replacement of the faulty BIOS with the selected BIOS is enabled by a mechanical switch or a hardware jumper (not shown) on the motherboard. For example, following a BIOS data modification, the system detects corruption of the system BIOS such as a system hang during POST. Consequently, an administrator powers off the system, opens the server chassis and sets a jumper.

The system can detect the hardware jumper and receive the status of the hardware jumper. For example, as illustrated in FIG. 1, BIOS 104 reads a register to retrieve status data of the hardware jumper.

Next, the system determines whether to restore a BIOS setting or image based on the status data of the hardware jumper. For example, BIOS 104 read a register to retrieve status data of the hardware jumper to determine if the system needs to restore a selected BIOS setting image. After determining that a BIOS setting needs to be restored, the system retrieves the previous active BIOS setting from a storage device. For example, as illustrated in FIG. 1, BIOS 104 retrieves a most recent valid BIOS setting stored in storage device 110 for replacing the faulty BIOS.

Storage device 110 can be any storage medium configured to store program instructions or data for a period of time. Storage device 110 is a shared memory between BMC 106 and BIOS 104, which can be coupled to BIOS 104 or BMC 106. Storage device 110 can also be an independent storage device. According to some embodiments, storage device 110 is a flash drive, a random access memory (RAM), a non-volatile random-access memory (NVRAM), a read-only memory, an electrically erasable programmable read-only memory (EEPROM), or a mailbox register.

Additionally, the administrator can determine a cause of the failure in executing the modified BIOS by analyzing the modifications in the stored BIOS record data.

Figure 2:
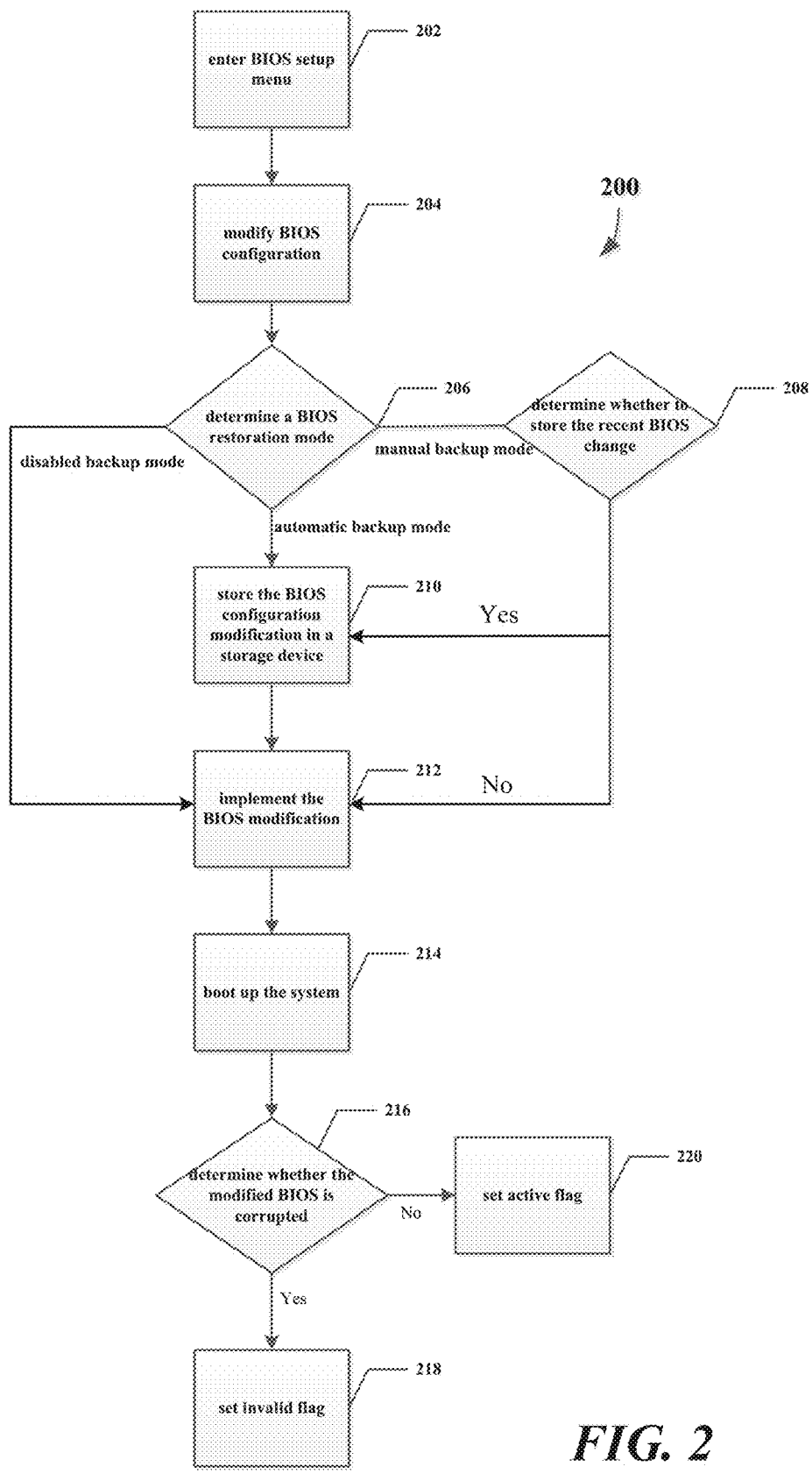
FIG. 2 is an example flow diagram that illustrates a BIOS backup process for a BIOS recovery management system, according to some embodiments.

FIG. 2 is an example flow diagram 200 that illustrates a BIOS backup process for a BIOS recovery management system, according to some embodiments. It should be understood that there can be additional, fewer, or alternative steps performed in similar or alternative orders, or in parallel, within the scope of the various embodiments unless otherwise stated.

At step 202, a system is booted into a BIOS setup menu displayed on a server management device. For example, as shown in FIG. 1, remote management device 101 connects to server 102 for viewing the present BIOS setting of server 102

At step 204, an administrator can modify one or more parameters of the present BIOS setting. For example, remote management device 101 sends modified BIOS configuration data to BMC 104 using a network interface such as RMCP+ over LAN, and change the BIOS setting accordingly. For example, after installing a new video card in server 102, an administrator changes "Active Video" to add-on PCIe card in the BIOS setup menu.

At step 206, the system can determine a BIOS restoration mode for the recent BIOS modification. According to some embodiments, there are at least three BIOS restoration modes: 1. an automatic backup mode which autonomously stores each BIOS modification data; 2. a manual backup mode which further query an administrator whether to store the recent BIOS modification; and 3. a disabled backup mode which disables the BIOS restoration function and allows the system working like an ordinary computing system.

At step 208, when the system is associated with a manual backup mode, it can prompt an administrator with a query message such as "Do you want to save the recent BIOS configuration for future restoration?" When the answer is positive, the system stores the recent BIOS configuration in a storage device, as illustrated in step 210. Conversely, when the answer is negative, the system skips the BIOS backup and starts implementing the BIOS modification.

Alternatively, the system can determine a set of rules specified by the administrator to determine whether to store a certain aspect of the BIOS data. For example, given the limited capacity of the storage device, the administrator requires only one or two critical BIOS to be selectively stored in storage device 110.

Similarly, when the system is associated with a disabled backup mode, the system can start implementing the BIOS modification without saving any previous BIOS setting images.

At step 210, when the system is associated with an automatic backup mode, the system autonomously stores each BIOS modification data into a storage device. BIOS modification data includes detailed editing information with regard to various parameters in the BIOS. For example, a boot priority order can be changed to allow one device to be booted instead another when two or more bootable devices are available. For example, after installing a new video card in server 102, an administrator changes "Active Video" to add-on PCIe card in the BIOS setup menu.

BIOS modification data includes BIOS record data over a predetermined period of time, such as one year. Additionally, BIOS modification data can also be capped at an amount that is defined by the administrator or limited by the data capacity of the storage device.

The storage device can be any storage medium configured to store program instructions or data for a period of time. For example, storage device 110 is a shared memory between BMC 106 and BIOS 104, which is coupled to BIOS 104 or BMC 106. Storage device 110 is an independent storage device. According to some embodiments, storage device 110 is a flash drive, a random access memory (RAM), a non-volatile random-access memory (NVRAM), a read-only memory, an electrically erasable programmable read-only memory (EEPROM), or a mailbox register. Additionally, when storage device 110 is associated with BMC 106, BIOS 104 transmits the BIOS modification data to BMC via a system bus.

At step 212, the system can be restarted to implement the BIOS modification. For example, BIOS 104 resets server 102 so that the newly modified BIOS data can take effect.

At step 214, the system can be booted up normally. For example, CPU 112 accesses BIOS 104 stored in a BIOS memory or chip and execute program instructions to initialize server 102.

At step 216, the system can determine whether the recently modified BIOS data is corrupted. For example, when one or more of the BIOS parameters are incorrect or incompatible with the system, server 102 cannot be rebooted. Corruption of the BIOS data may be due to various causes, such as errors in writing the code into the memory device, or a failure in a memory cell that stores the recent BIOS modification. According to some embodiments, a checksum function is executed on at least a portion of the BIOS. According to some embodiments, a timeout of a watchdog timer indicates that the execution of the BIOS is not completed as planned.

At step 218, the system, in response to detecting that the BIOS is corrupted, can set an error indicator, such as an "invalid" flag, for further actions such as flashing the incorrect BIOS with a selected BIOS setting image, as explained in the following specification.

Alternatively, at step 220, the system can set a "valid" flag when the system boots up normally.

Figure 3:
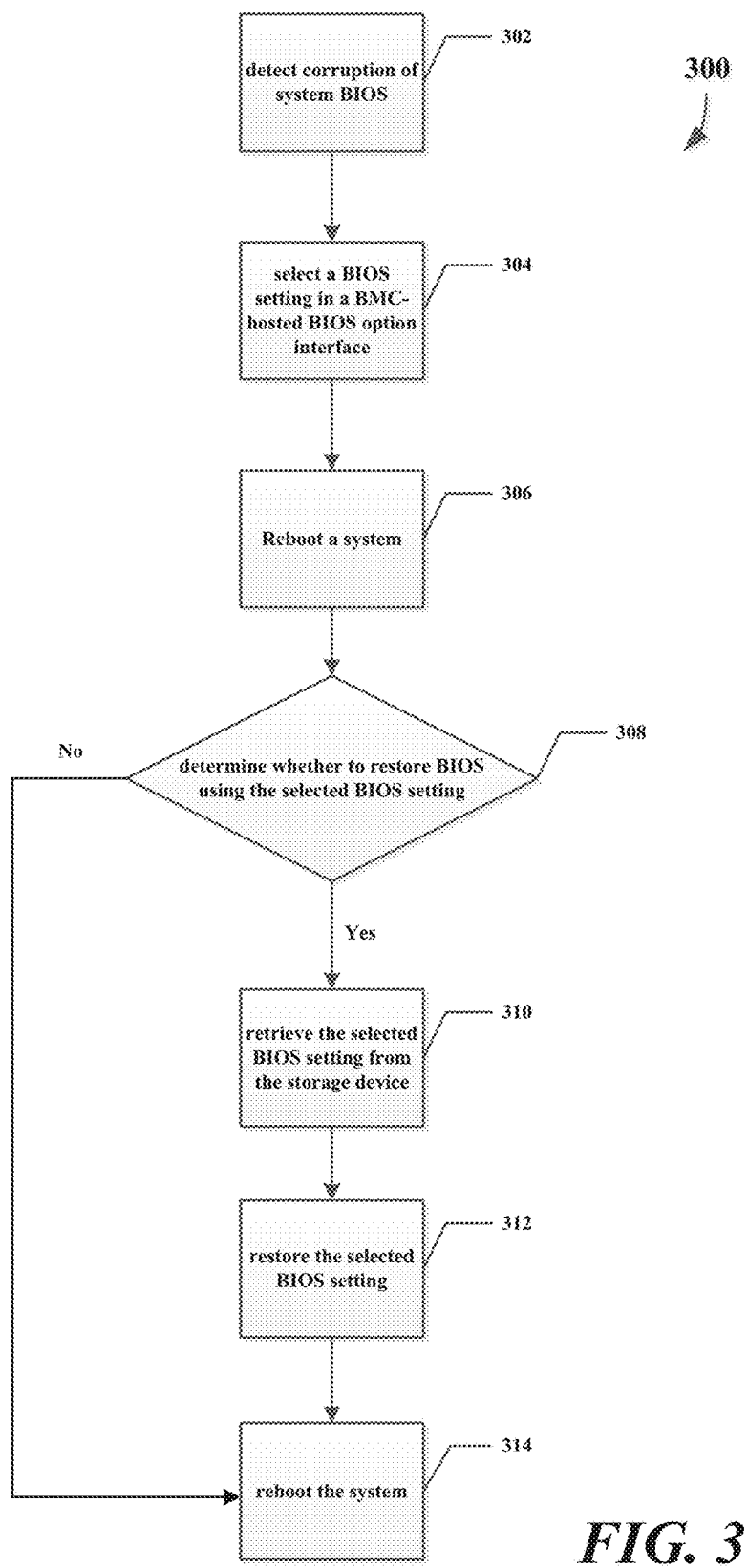
FIG. 3 is another example flow diagram that illustrates a BIOS retrieval process for a BIOS recovery management system, according to some embodiments.

FIG. 3 is another example flow diagram 300 that illustrates a BIOS retrieval process for a BIOS recovery management system, according to some embodiments. It should be understood that there can be additional, fewer, or alternative steps performed in similar or alternative orders, or in parallel, within the scope of the various embodiments unless otherwise stated.

At step 302, following a BIOS data modification, the system can detect corruption of the system BIOS such as a system hang during POST. For example, the system detects the error indicator set in step 218 of FIG. 2.

At step 304, an administrator can select a BIOS setting or image in a BMC-hosted GUI interface. For example, an administrator, using remote management device 101, requests a BIOS modification log to be displayed in a web interface hosted by BMC 106. BMC 106 hosts GUI interface 108 that displays multiple optional BIOS setting images in a BIOS option log via a web interface. For example, BMC 106 retrieves BIOS record data in storage device 110. Accordingly, an administrator browses the optional BIOS setting images and select a preferred BIOS setting image for overriding the corrupted system BIOS. For example, GUI interface 108 displays a list of BIOS setting image options on remote management device 101 a web interface. Based the system's requirement, an administrator thus selects a BIOS setting image to replace the faulty BIOS setting. Consequently, BMC 106 notifies BIOS 104 of which BIOS setting image has been selected for booting up the system.

At step 306, the system can be rebooted with the selected BIOS setting image or setting. For example, the system retrieves BIOS data information associated with the selected BIOS setting image that is stored in storage device 110.

At step 308, the system can determine whether to restore BIOS using a selected BIOS setting. For example, via a system bus, BIOS 104 queries BMC 106 during early POST to determine if the system needs to restore a selected BIOS setting image.

At step 310, when the system is confirmed to reboot from a selected BIOS setting image, BIOS 104 can retrieve the BIOS setting image data in storage device 110.

At step 312, the BIOS can restore the selected BIOS setting image or setting. For example, the selected BIOS setting image is flashed into a memory device for BIOS 104, such as an EEPROM. According to some embodiments, a BIOS driver replaces the existing BIOS setting with the selected BIOS setting.

At step 314, after the BIOS is replaced with the selected BIOS setting, the system is rebooted as normal. Alternatively, depending on the restored settings, the system can continue the booting process.

Figure 4:
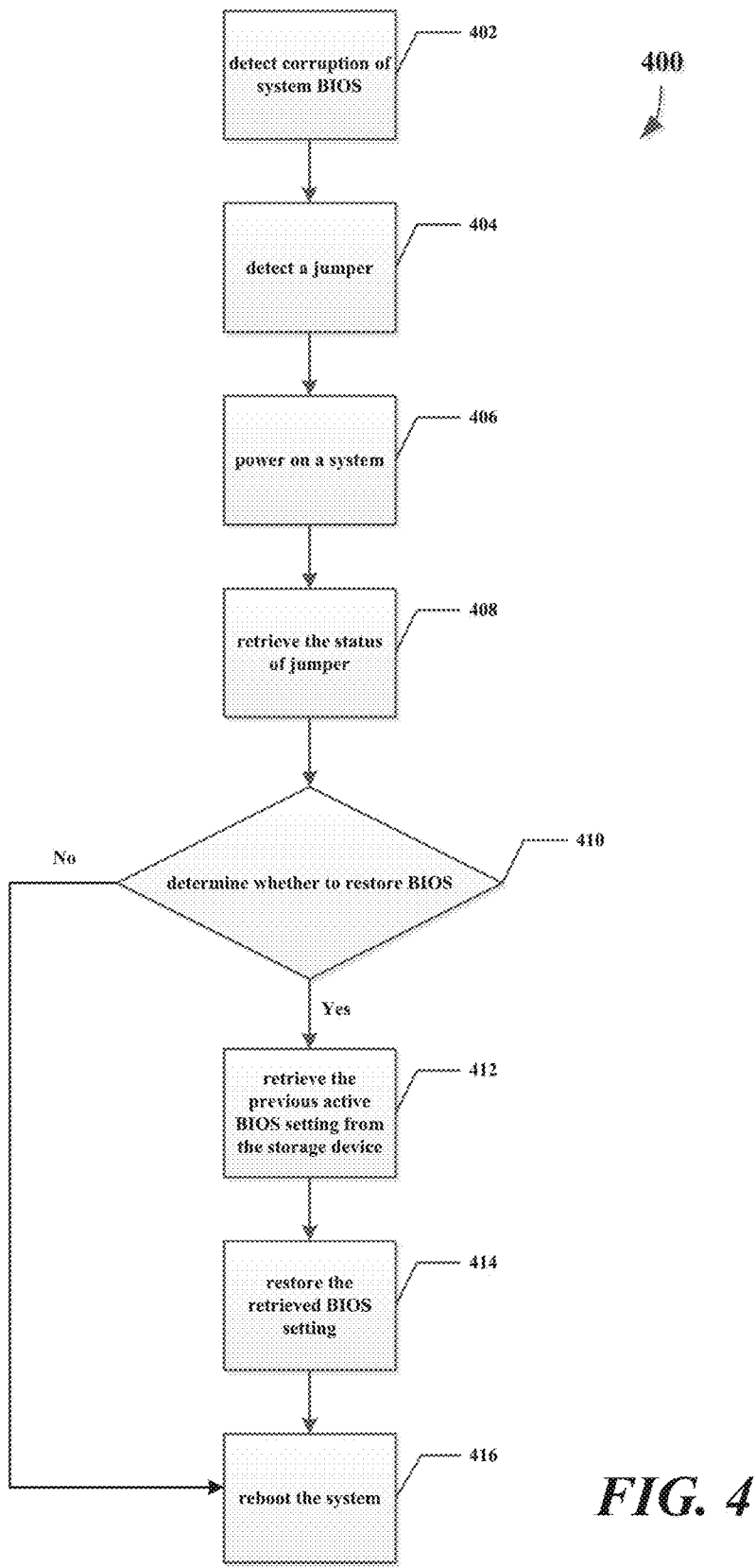
FIG. 4 is another example flow diagram that illustrates a BIOS retrieval process for a BIOS recovery management system using a hardware jumper, according to some embodiments.

FIG. 4 is another example flow diagram 400 that illustrates a BIOS retrieval process for a BIOS recovery management system using a hardware jumper, according to some embodiments. According to some embodiments, the replacement of the faulty BIOS with the selected BIOS is enabled by a mechanical switch or a hardware jumper on the motherboard. For example, when the system does not have a BMC or the BMC has malfunctioned, a hardware jumper can be used to trigger the BIOS setting restoration, as described herein.

At step 402, following a BIOS data modification, the user may find corruption of the system BIOS such as a system hang during POST. For example, the BIOS has malfunctioned and cannot boot to the OS.

Alternatively, they system can determine that the new BIOS setting is faulty and cannot boot up the computer via a time-out mechanism such as a watchdog time-out mechanism. As a result, the system can autonomously trigger the BIOS restoration process, e.g., restoring to the latest functional BIOS settings.

At step 404, the system can detect a hardware jumper configured to trigger a restore process. For example, an administrator powers off the system, opens the server chassis and sets a jumper.

At step 406, the system can be powered on in response to detecting the hardware jumper. For example, an administrator powers on the system.

At step 408, the system can receive the status of the hardware jumper. For example, as illustrated in FIG. 1, BIOS 104 reads a register to retrieve status data of the hardware jumper.

At step 410, the system can determine whether to restore a BIOS setting based on the status data of the hardware jumper. For example, BIOS 104 reads the jumper status data to determine if the system needs to restore a selected BIOS setting image. When a jumper is installed or a switch is turned on, BIOS 104, by reading the status data stored in a register, can determine a high status of the jumper that requires a selected BIOS setting to be restored.

At step 412, when the system determines that a BIOS setting needs to be restored, it can retrieve the previous active BIOS setting from the storage device. For example, as illustrated in FIG. 1, BIOS 104 retrieves a most recent valid BIOS setting stored in storage device 110.

At step 414, the system can restore the retrieved BIOS setting. For example, the most recent BIOS setting is flashed into a memory device for BIOS 104. According to some embodiments, a BIOS driver replaces the existing BIOS setting with the most recent BIOS setting.

At step 416, after the corrupted BIOS is replaced with the valid BIOS setting, the system boots up normally. Alternatively, depending on the restored settings, the system can continue the booting process.

Figure 5:
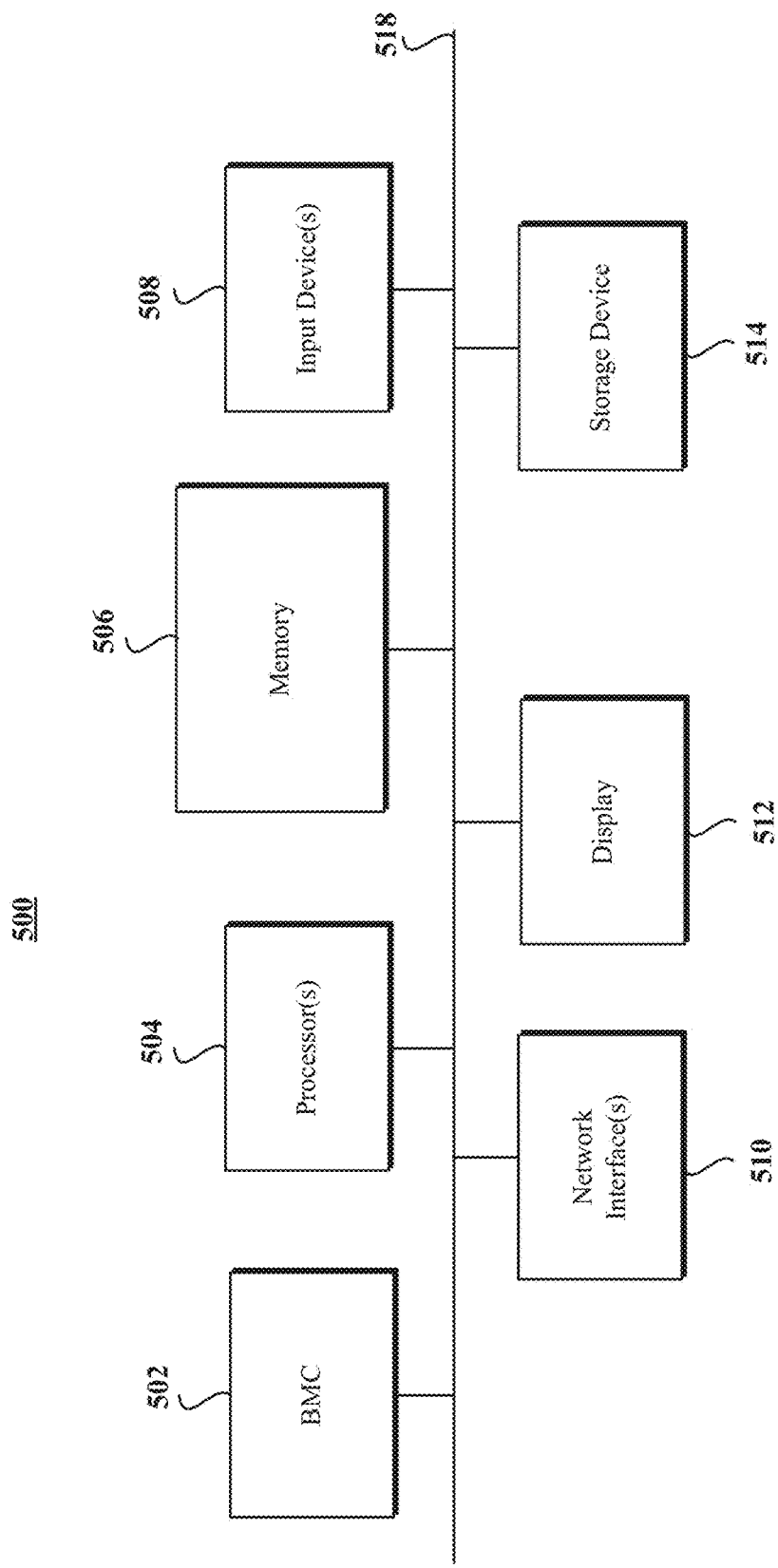
FIG. 5 illustrates a computing platform of a computing device, according to some embodiments.

FIG. 5 illustrates an example system architecture 500 for implementing the systems and processes of FIGS. 1-5. Computing platform 500 includes a bus 518 which interconnects subsystems and devices, such as: BMC 502, processor 504, system memory 506, input device 508, a network interface(s) 510, display 512, and storage device 514. Processor 504 can be implemented with one or more central processing units ("CPUs"), such as those manufactured by Intel® Corporation—or one or more virtual processors—as well as any combination of CPUs and virtual processors. Computing platform 500 exchanges data representing inputs and outputs via input-and-output devices input devices 508 and display 512, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 500 performs specific operations by processor 504, executing one or more sequences of one or more instructions stored in system memory 506. Computing platform 500 can be implemented as a server device or client device in a client-server arrangement, peer-to-peer arrangement, or as any mobile computing device, including smart phones and the like. Such instructions or data may be read into system memory 506 from another computer readable medium, such as a storage device. In some examples, hard-wired circuitry may be used in place of or in combination with software instructions for implementation. Instructions may be embedded in software or firmware. The term "computer readable medium" refers to any tangible medium that participates in providing instructions to processor 504 for execution. Such a medium may take many forms, including, but not limited to, non-volatile media and volatile media. Non-volatile media includes, for example, optical or magnetic disks and the like. Volatile media includes dynamic memory, such as system memory 506.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLUSH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 518 for transmitting a computer data signal.

In the example shown, system memory 506 can include various software programs that include executable instructions to implement functionalities described herein. In the example shown, system memory 506 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A computer-implemented method, comprising:
determining a basic input/output system (BIOS) mode for BIOS modifications of a BIOS of the computing device, the BIOS mode selected from an automatic backup mode, a disabled backup mode, and a manual backup mode, wherein BIOS modification data is automatically stored during the automatic backup mode, wherein a user is queried whether to store BIOS modification data during the manual backup mode, and wherein, during the disabled backup mode, which disables a BIOS restoration function, the computing device is configured to implement the BIOS modifications without saving any previous BIOS setting image;
determining that the BIOS mode is the automatic backup mode;
storing a firmware modification record to a storage medium of a computing device, the firmware modification record including at least one setting of the BIOS of the computing device;
modifying the at least one setting in the BIOS;
determining a failure in executing the modified BIOS;
retrieving, in response to the determining, at least a portion of the firmware modification record from the storage medium; and
restoring, based at least in part on the at least a portion of the firmware modification record, one or more settings of BIOS.

2. The computer-implemented method of claim 1, further comprising:
receiving a plurality of BIOS settings to generate the firmware modification record, each of the plurality of BIOS settings associated with a respective modification of the at least one setting in the BIOS.

3. The computer-implemented method of claim 2, further comprising:
providing, using a service controller of the computing device, a BIOS option interface for a selection of the plurality of BIOS settings; and
receiving, via a network interface of the service controller, a selected one of the plurality of BIOS settings.

4. The computer-implemented method of claim 3, wherein the selected one of the plurality of BIOS settings comprises one or more parameters previously modified by an administrator of the computing device.

5. The computer-implemented method of claim 1, further comprising:
determining, by querying a service controller, that a valid BIOS needs to be restored.

6. The computer-implemented method of claim 1, further comprising:

determining a cause of the failure in executing the modified basic input/output system based at least in part on the firmware modification record.

7. A system, comprising:
a processor; and
a memory including instructions that, if executed by the system, cause the system to:
determine a basic input/output system (BIOS) mode for BIOS modifications of a BIOS of the system, the BIOS mode selected from an automatic backup mode, a disabled backup mode, and a manual backup mode, wherein BIOS modification data is automatically stored during the automatic backup mode, wherein a user is queried whether to store BIOS modification data during the manual backup mode, and wherein, during the disabled backup mode, which disables a BIOS restoration function, the system is configured to implement the BIOS modifications without saving any previous BIOS setting image;
determine that the BIOS mode is the automatic backup mode;
store a firmware modification record to a storage medium of the system, the firmware modification record including at least one setting of the BIOS;
modify the at least one setting in the BIOS;
determine a failure in executing the modified BIOS;
retrieve, in response to the determining, at least a portion of the firmware modification record from the storage medium; and
restore, based at least in part on the at least a portion of the firmware modification record, one or more settings of the BIOS.

8. The system of claim 7, wherein the instructions further cause the system to:
receive a plurality of BIOS settings to generate the firmware modification record, each of the plurality of BIOS settings associated with a respective modification of the at least one setting in the BIOS.

9. The system of claim 7 wherein the instructions further cause the system to:
provide, using a service controller of the system, a BIOS option interface for a selection of the plurality of BIOS settings; and
receive, via a network interface of the service controller, a selected one of the plurality of BIOS settings.

10. The system of claim 7, wherein the storage medium is associated with a service controller of the system.

11. The system of claim 7, wherein the storage medium is configured to be shared between a service controller of the system and the BIOS.

12. The system of claim 7, wherein the instructions further cause the system to:
determine whether to store one of the plurality of BIOS settings by querying an administrator of the system.

13. The system of claim 7, wherein the instructions further cause the system to:
determine the at least a portion of the firmware modification record based at least in part on a selection by an administrator in a GUI interface.

14. The system of claim 7, wherein the instructions further cause the system to:
connect a jumper to the system, the jumper configured to trigger a restoration of the BIOS.

15. A computer program stored on a non-transitory computer-readable storage medium, the computer program comprising:
code for determining a basic input/output system (BIOS) mode for BIOS modifications of a BIOS of a computing device, the BIOS mode selected from an automatic backup mode, a disabled backup mode, and a manual backup mode, wherein BIOS modification data is automatically stored during the automatic backup mode, wherein a user is queried to store BIOS modification data during the manual backup mode, and wherein, during the disabled backup mode, which disables a BIOS restoration function, the computing device is configured to implement the BIOS modifications without saving any previous BIOS setting image;
code for determining that the BIOS mode is the automatic backup mode;
code for storing a firmware modification record to a storage medium of the computing device, the firmware modification record including at least one setting of the BIOS of the computing device;
code for modifying the at least one setting in the BIOS;
code for determining a failure in executing the modified BIOS;
code for retrieving, in response to the determining, at least a portion of the firmware modification record from the storage medium; and
code for restoring, based at least in part on the at least a portion of the firmware modification record, one or more settings of the BIOS.

16. The computer program of claim 15, further comprising:
code for receiving a plurality of BIOS settings to generate the firmware modification record, each of the plurality of BIOS settings associated with a respective modification of the at least one setting in the BIOS.

17. The computer program of claim 15, further comprising:
code for providing, using a service controller of the computing device, a BIOS option interface for a selection of the plurality of BIOS settings; and
receive, via a network interface of the service controller, a selected one of the plurality of BIOS settings.

18. The computer program of claim 15, wherein the storage medium is associated with a service controller of the computing device.

19. The computer program of claim 15, further comprising:
code for determine whether to store one of the plurality of BIOS settings by querying an administrator of the computing device.

20. The computer program of claim 15, further comprising:
code for connecting a jumper to the computing device, the jumper configured to trigger a restoration of the BIOS.

* * * * *